US008620377B2

(12) United States Patent
Choi

(10) Patent No.: US 8,620,377 B2
(45) Date of Patent: *Dec. 31, 2013

(54) HYBRID PHONE AND METHOD OF ACQUIRING CHANNEL IN THE HYBRID PHONE

(75) Inventor: Jang-Suk Choi, Seoul (KR)

(73) Assignee: Pantech Co., Ltd., Seoul (KR)

( * ) Notice: Subject to any disclaimer, the term of this patent is extended or adjusted under 35 U.S.C. 154(b) by 110 days.

This patent is subject to a terminal disclaimer.

(21) Appl. No.: 13/032,207

(22) Filed: Feb. 22, 2011

(65) Prior Publication Data

US 2011/0142026 A1 Jun. 16, 2011

Related U.S. Application Data

(63) Continuation of application No. 11/263,241, filed on Oct. 31, 2005, now Pat. No. 7,912,496.

(30) Foreign Application Priority Data

Jan. 4, 2005 (KR) .................. 10-2005-0000550

(51) Int. Cl.
*H04M 1/00* (2006.01)

(52) U.S. Cl.
USPC ..... 455/552.1; 455/421; 455/433; 455/553.1; 370/465

(58) Field of Classification Search
USPC ................ 455/421, 552.1, 552.3, 431–435.3; 370/465
See application file for complete search history.

(56) References Cited

U.S. PATENT DOCUMENTS

| 6,738,373 | B2 * | 5/2004 | Turner ................. 370/352 |
| 7,212,832 | B2 | 5/2007 | Yokota |
| 2003/0083097 | A1 | 5/2003 | Kim |
| 2003/0087680 | A1 | 5/2003 | Kim |
| 2003/0096611 | A1 * | 5/2003 | Cooper ................. 455/434 |
| 2004/0037222 | A1 | 2/2004 | Kim et al. |
| 2004/0203834 | A1 | 10/2004 | Mahany |
| 2006/0046661 | A1 | 3/2006 | Ekvetchavit et al. |
| 2006/0153139 | A1 * | 7/2006 | Bae et al. ................. 370/335 |
| 2006/0246885 | A1 * | 11/2006 | Lee ................. 455/421 |

OTHER PUBLICATIONS

Non-Final Office Action of U.S. Appl. No. 11/263,241 issued on Dec. 26, 2007, corresponding to U.S. Appl. No. 11/263,241.
Final Office Action of U.S. Appl. No. 11/263,241 issued on Aug. 4, 2008 corresponding to U.S. Appl. No. 11/263,241.
Notice of Allowance of U.S. Appl. No. 11/263,241 issued on Nov. 16, 2010, corresponding to U.S. Appl. No. 11/263,241.

* cited by examiner

*Primary Examiner* — Liton Miah
(74) *Attorney, Agent, or Firm* — H.C. Park & Associates, PLC

(57) ABSTRACT

A hybrid phone to acquire channels has a first communication mode supporting voice/low-rate data communications and a second communication mode supporting high-rate data communication, and includes a phone control unit having a communication processor controlling voice/data communications according to programs stored in a memory. The communication processor includes a channel acquisition processor attempting to acquire channels for the first and second communication modes. If the channel acquisition processor cannot acquire a channel for the second communication mode within a predetermined time, the channel acquisition processor stops attempting to acquire the channel for the second communication mode and reattempts to acquire the channel for the first communication mode. If the channel acquisition processor acquires the channel for the first communication mode, the channel acquisition processor reattempts to acquire the channel for the second communication mode.

4 Claims, 4 Drawing Sheets

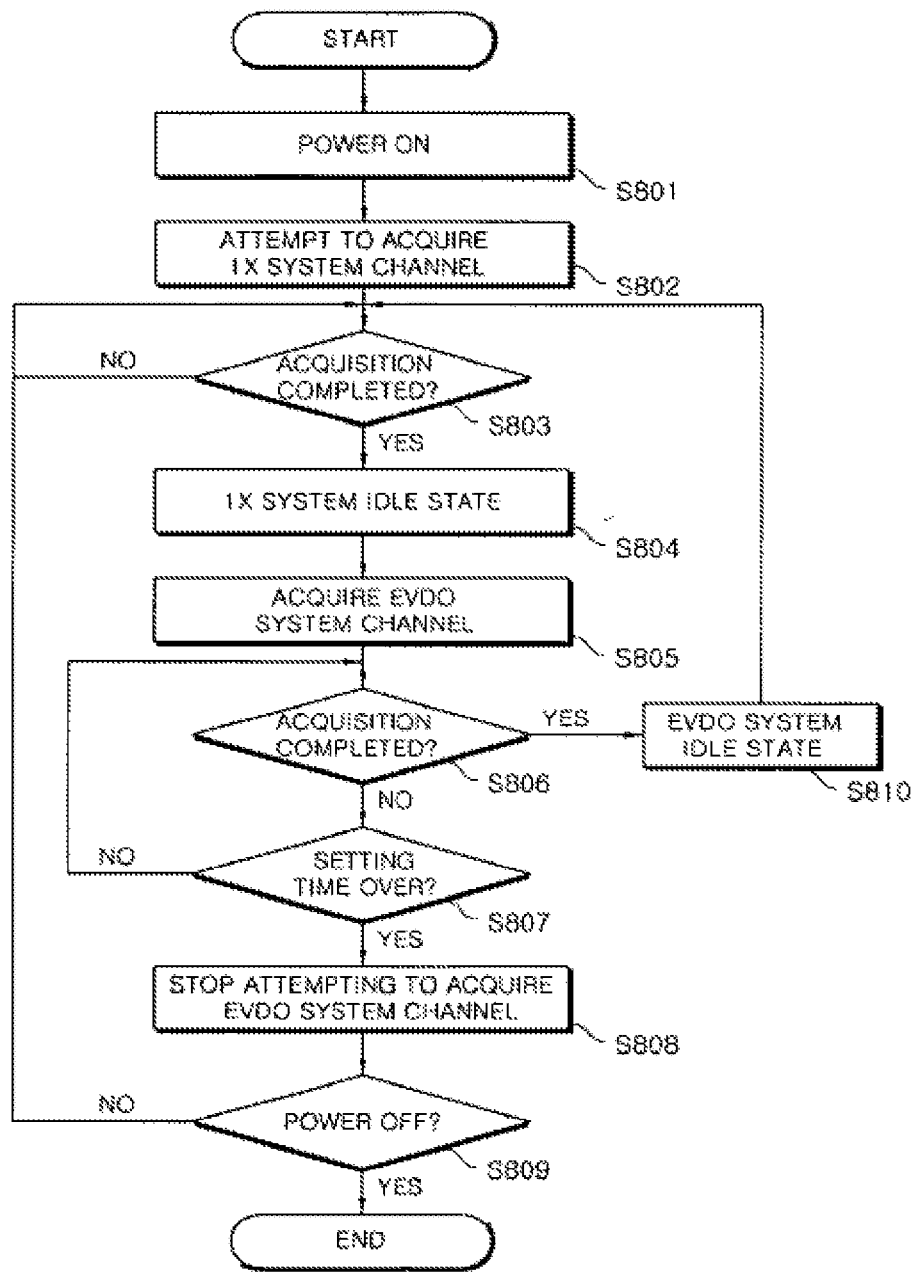

HYBRID PHONE AND METHOD OF ACQUIRING CHANNEL IN THE HYBRID PHONE

CROSS REFERENCE TO RELATED APPLICATIONS

This application is a continuation of U.S. patent application Ser. No. 11/263,241, filed on Oct. 31, 2005 and claims the benefit of and the priority from Korean Patent Application No. 10-2005-0000550, filed on Jan. 4, 2005, which are both hereby incorporated by reference for all purpose as if fully set forth herein.

BACKGROUND

1. Field of the Invention

The present invention relates to a mobile communication terminal and, more particularly, to a technology of improving voice call success ratio in a hybrid phone supporting voice, low-rate and high-rate data communications.

2. Description of Related Art

A hybrid phone refers to a mobile communication terminal which allows a user to use voice and low-rate data communication services over an IS-95/1x network and to use a high-rate data communication service over a High Data Rate (HDR) network by combining IS-95/1x technology with HDR technology.

The HDR technology refers to a packet wireless data transmission technology developed using CDMA technology by Qualcomm Inc., which allows mega class high-speed data transmission, e.g., a maximum transmission speed of 2.547 Mbps within a CDMA cell site. HDR offers a transmission speed as fast as 16 times the maximum transmission speed of 153.6 Kbps on a forward channel of the IS-95/1x system and also provides a data transmission capacity as much as 5 times that of the IS-95/1x system.

HDR offers a user with a hybrid phone voice and high-speed wireless data services by means of an HDR access point function provided independently from a Base Transceiver Station (BTS) or an HDR access point function incorporated in the BTS.

FIG. 1 is a block diagram of a mobile communication system according to the prior art. A mobile communication system 100 includes an IS-95/1x network module 110 processing voice communication and an HDR network module 120 processing high-speed data communication. The IS-95/1x network module 110 includes an IS-95/1x BTS 111, a Base Station Controller (BSC) 112, a Mobile Switching Center (MSC) 113, and an InterWorking Function (IWF) 116. The HDR network module 120 includes an HDR access point 121, a BSC 112, a Packet Control Function (PCF) 123, a Packet Data Serving Node (PDSN) 124, and a Home Agent (HA) 125.

The IS-95/1x BTS 111 establishes a wireless connection with a hybrid phone 200 in an IS-95/1x mode, and acts to convert signal formats to be suitable for wireless and wireline links. The BSC 112 handles allocation of radio channels, receives measurements from the hybrid phone, and controls handovers from BTS to BTS. The MSC 113 is a sophisticated telephone exchange which provides circuit-switched calling and mobility management to the hybrid phone roaming within the area that it serves. The IWF 116 is used to provide circuit switched data services when connecting a mobile communication network to the Internet.

The HDR access point 121 establishes a wireless connection with the hybrid phone 200 for high-speed data communication and controls data transfer with the hybrid phone 200. The HDR access point 121 may be provided separately from or incorporated in the IS-95/1x BTS 111 of the IS-95/1x network module 110. The BSC 112, which is also used for the IS-95/1x network module 110, performs a process required for operation of the HDR access point 121. The PCF 123 controls the transmission of packets between the HDR access point 121 and the PDSN 124. The PDSN 124 is responsible for the establishment, maintenance and termination of a PPP (Point-to-Point Protocol) session towards hybrid phones. The HA 125 performs mobile IP authentication for packet data services in connection with the PDSN 124.

The hybrid phone 200 detects signal strengths of base stations over a pilot channel upon initial power-on, makes synchronization with a base station having the largest signal strength over a sync channel, and requests hybrid phone location registration and subscriber authentication from the IS-95/1x BTS 111. The hybrid phone 200 performs a channel acquisition process upon completion of successful location registration and subscriber authentication.

The hybrid phone 200 acquires a channel for voice and low-rate data communication modes using the IS-95/1x technology and acquires a channel for a high-rate data communication mode by making reference to a Preferred Roaming List (PRL) file containing a channel list of each communication mode stored in a memory upon manufacture of the hybrid phone 200.

FIG. 2 is a flow chart of a conventional channel acquisition process in a hybrid phone. Upon power-on, a hybrid phone attempts to acquire a channel for a first communication mode supporting voice and low-rate data communications (operations S401, S402). The hybrid phone switches the first communication mode to an idle state after acquiring the channel (operations S403, S404). Subsequently, the hybrid phone attempts to acquire a channel for a second communication mode supporting high-rate date communication (operation S405). The hybrid phone determines whether or not the channel for the second communication mode has been acquired (operation S406). If the channel is determined to have been acquired, the second communication mode is switched to an idle state (operation S407). The hybrid phone reattempts to acquire a channel for the first communication mode. If the channel is determined to have been acquired, operations S402 to S406 are repeated to attempt to acquire a channel for the second communication mode. Next, the hybrid phone determines whether or not a power-off signal is input (operation S408). If the power-off signal is not input, operation S402 is performed to attempt to acquire a channel for the first communication mode. If the power-off signal is input, the channel acquisition process is ended.

As described above, the hybrid phone is configured to acquire channels for each communication mode so that a user can use both voice/low-rate data communication services and a high-rate data communication service. That is, the hybrid phone acquires a channel for the first communication mode for voice and low-rate data communications and a channel for the second communication mode for high-rate data communication, and periodically monitors slots assigned for the first and second communication modes to perform a paging process.

However, when the hybrid phone is located in an area in which data communication services do not work well, e.g., in an area in which channels for voice and low-rate data communication modes can be acquired but channels for a high-rate data communication mode cannot be acquired, the hybrid phone continuously attempts to acquire channels for the high-rate data communication mode while the voice and low-rate data communication mode is maintained in an idle state. In this case, it is difficult for the hybrid phone to receive voice calls normally. Accordingly, there is a problem in that the hybrid phone has a lower voice call success ratio than a mobile phone supporting only voice and low-rate data communication services.

SUMMARY

Exemplary embodiments of the present invention provide a hybrid phone supporting a voice/low-rate data communication service and a high-rate data communication service, which may be capable of providing voice call success ratio as high as a mobile phone supporting only voice and low-rate data communication services.

Additional features of the invention will be set forth in the description which follows, and in part will be apparent from the description, or may be learned by practice of the invention.

An exemplary embodiment of the present invention discloses a hybrid phone having a first communication mode supporting voice and low-rate data communications and a second communication mode supporting high-rate data communication, the hybrid phone including: a key input unit; a display unit displaying menus and operation states; a wireless communication unit extracting voice and data signals from a wireless signal transmitted and received via an antenna; a voice processor inputting and outputting the voice signal from the wireless communication unit through a microphone and a speaker; a memory storing execution programs and related data; and a phone control unit having a communication processor which controls voice and data communications according to the execution program stored in the memory, where the communication processor further includes a channel acquisition processor which attempts to acquire channels for the first and second communication modes, and if the channel acquisition processor does not acquire a channel for the second communication mode within a predetermined time interval, the channel acquisition processor stops attempting to acquire a channel for the second communication mode and reattempts to acquire a channel for the first communication mode, and, if the channel acquisition processor acquires a channel for the first communication mode, the channel acquisition processor reattempts to acquire a channel for the second communication mode.

The channel acquisition processor may attempt to acquire a channel according to a channel list of each communication mode contained in a PRL (Preferred Roaming List) file stored in the memory.

An exemplary embodiment of the present invention also discloses a method of acquiring a channel in a hybrid phone having a first communication mode supporting voice and low-rate data communications and a second communication mode supporting high-rate data communication, the method including the operations of: attempting to acquire a channel for the first communication mode; switching the first communication mode to an idle state after the channel is acquired; attempting to acquire a channel for the second communication mode; switching the second communication mode to an idle state after the channel is acquired, and, if the channel has not been acquired, determining whether or not the time set for the channel acquisition has been elapsed; and reattempting to acquire a channel for the second communication mode if the time set for the channel acquisition is not determined to have been elapsed, and stopping attempting to acquire a channel for the second communication mode if the time set for the channel acquisition is determined to have been elapsed.

The operation of attempting to acquire a channel may include attempting to acquire a channel according to a channel list of each communication mode contained in a PRL file stored in a memory of the hybrid phone.

It is to be understood that both the foregoing general description and the following detailed description are exemplary and explanatory and are intended to provide further explanation of the invention as claimed.

BRIEF DESCRIPTION OF THE DRAWINGS

The above and other features and advantages of the present invention will become more apparent by describing in detail exemplary embodiments thereof with reference to the attached drawings in which:

FIG. 4 is a flow chart of a channel acquisition process of a channel acquisition processor of FIG. 3.

DETAILED DESCRIPTION OF THE ILLUSTRATED EMBODIMENTS

Exemplary embodiments in accordance with the present invention will now be described in more detail with reference to the accompanying drawings.

Figure 1:
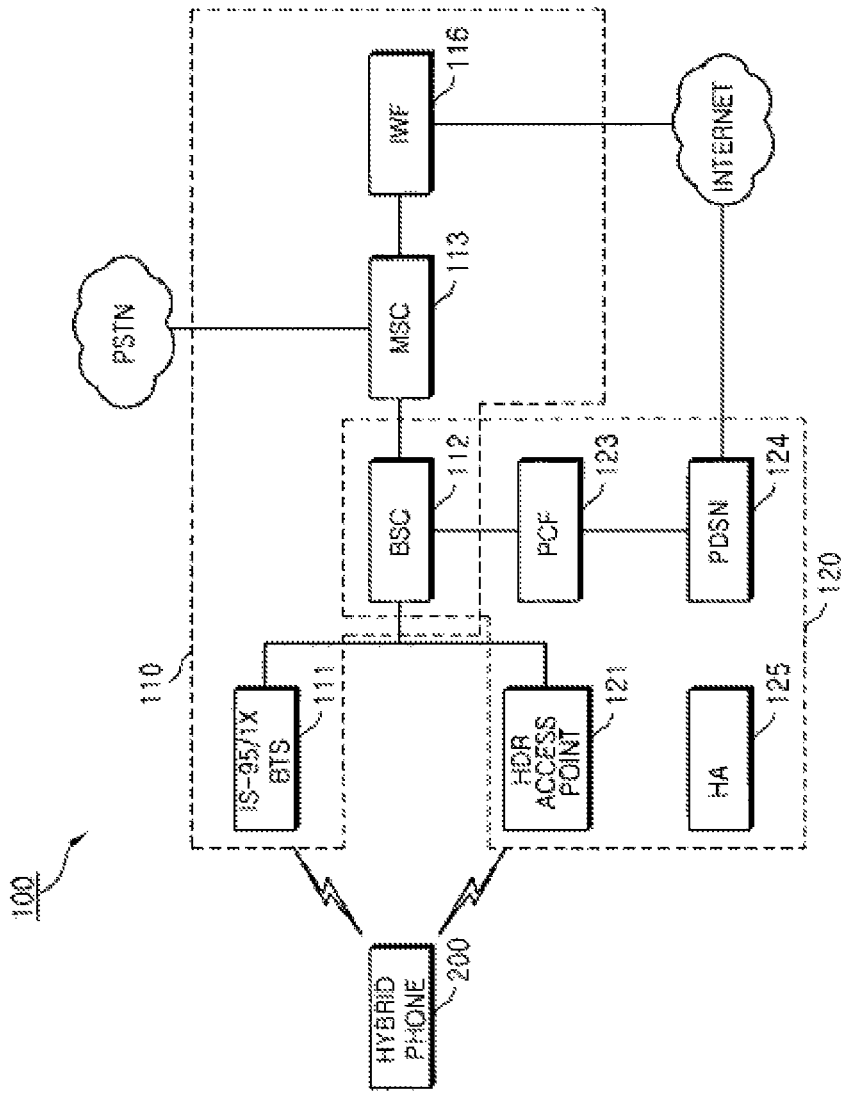
FIG. 1 is a block diagram of a mobile communication network of the prior art.
Figure 2:
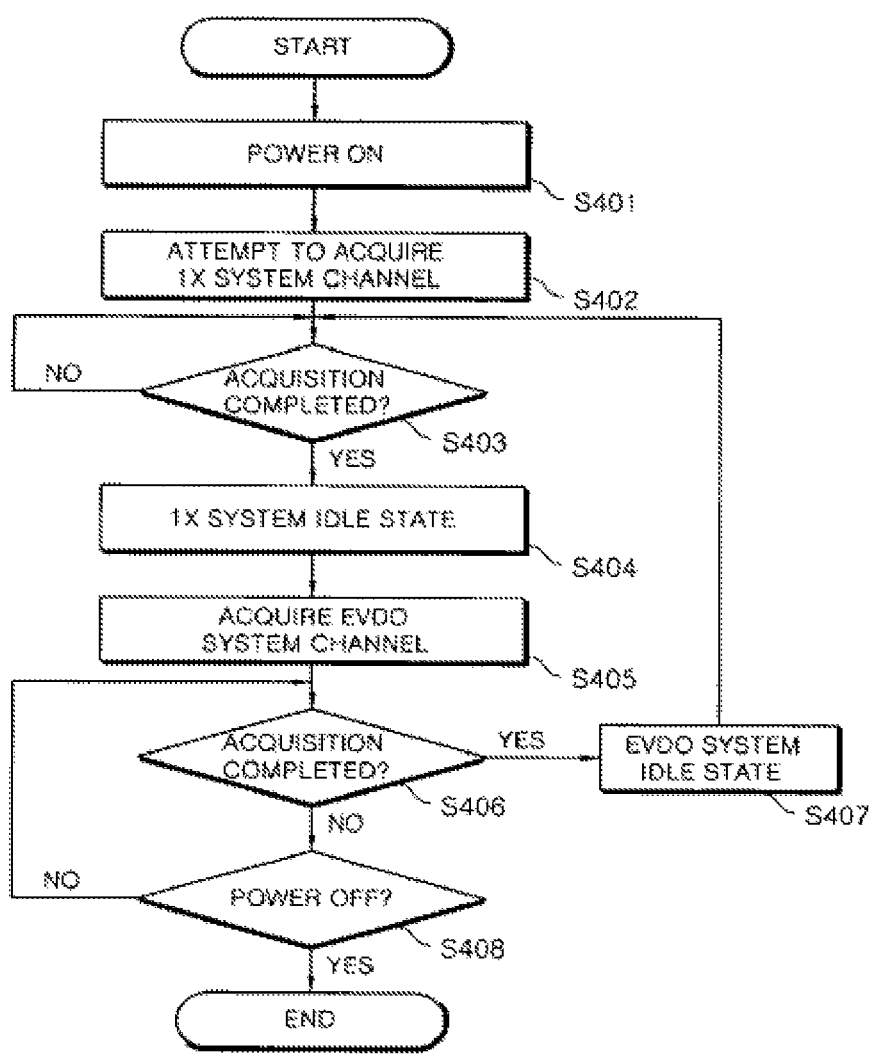
FIG. 2 is a flow chart of a conventional channel acquisition process of a hybrid phone.
Figure 3:
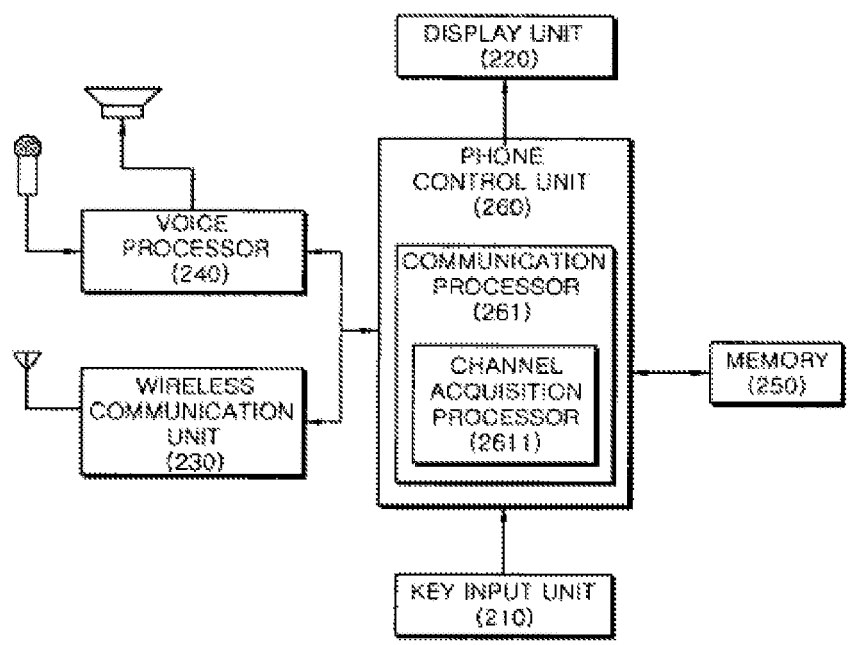
FIG. 3 is a block diagram of a hybrid phone in accordance with an embodiment of the present invention.

FIG. 3 is a block diagram of a hybrid phone in accordance with an embodiment of the present invention.

The hybrid phone includes a key input unit 210, a display unit 220, a wireless communication unit 230, a voice processor 240, a memory 250, and a phone control unit 260.

The key input unit 210 is a typical keypad controlled by a user to send a signal to the phone control unit 260. The display unit 220 acts to display menus and operation states of the hybrid phone for the user. An example of the display unit 220 is a liquid crystal display (LCD) device. The wireless communication unit 230 includes an antenna and a radio frequency (RF) module to communicate with base stations. The wireless communication unit 230 is construed to be applicable to existing mobile communication systems, such as CDMA, GSM, and W-CDMA, and future mobile communication systems. The voice processor 240 converts digital voice data into an analog voice signal and vice versa. The voice processor 240 includes an audio amplifier, a filter, and the like.

The memory 250 may be a signal chip configured to include a Static Random Access Memory (SRAM) having a capacity of several megabits and a flash memory having a capacity of tens of megabits. In one embodiment, the memory 250 stores a Preferred Roaming List (PRL) file. The PRL file includes an acquisition table (ACQ table) and a system table. The acquisition table includes a plurality of indexes each indicating a priority of channel acquisition in each communication mode in each area. The system table includes area information, PRL information, acquisition table index, roaming index, system ID (SID), and network ID (NID). The PRL file may be stored in the memory upon manufacture of a hybrid phone, or may be provided to a hybrid phone when the hybrid phone requests a download or upgrade from an Over-The-Air (OTA) server which is provided and operated in a mobile communication network.

A baseband circuit of the wireless communication unit 230 and most circuits of the phone control unit 260 are integrated into a commercially available single integrated circuit. The integrated circuit includes hardware dedicated for communication, a digital signal processor, and a general-purpose microprocessor. The phone control unit 260 includes a communication processor 261 for controlling voice data communication.

The communication processor 261 includes a first communication mode for supporting voice and low-rate data communications, and a second communication mode for supporting high-rate data communication. The communication processor 261 further includes a channel acquisition processor 2611 which attempts to acquire channels for the first and second communication modes. If the channel acquisition processor 2611 does not acquire a channel for the second communication mode within a predetermined time interval, the channel acquisition processor 2611 stops attempting to acquire a channel for the second communication mode and reattempts to acquire a channel for the first communication mode. If the channel acquisition processor 2611 acquires a channel for the first communication mode, the channel acquisition processor 2611 reattempts to acquire a channel for the second communication mode.

FIG. 4 is a flow chart of a channel acquisition process in the channel acquisition processor 2611 shown in FIG. 3. As described above, a hybrid phone according to an exemplary embodiment of the present invention includes a first communication mode for supporting voice and low-rate data communication services, and a second communication mode for supporting a high-rate data communication service.

The channel acquisition unit 2611 attempts to acquire a channel for the first communication mode upon power-on of the hybrid phone (operations S801 and S802). The channel acquisition processor 2611 changes the first communication mode to an idle state after the channel is acquired (operations S803 and S804). Next, the channel acquisition processor 2611 attempts to acquire a channel for the second communication mode (operation S805). According to an embodiment of the present invention, the channel acquisition processor 2611 attempts to acquire channels according to a channel list of each communication mode contained in PRL information stored in a memory upon attempting to acquire channels for the first and second communication modes.

The channel acquisition processor 2611 determines whether or not a channel for the second communication mode has been acquired (operation S806). If the channel for the second communication mode is not determined to have been acquired, the channel acquisition processor 2611 determines whether or not the time set for the channel acquisition has been elapsed (operation S807).

If the time set for the channel acquisition is not determined to have been elapsed, the channel acquisition processor 2611 reattempts to acquire a channel for the second communication mode. If the set time has elapsed, the channel acquisition processor 2611 stops attempting to acquire a channel for the second communication mode (operation S808). Next, the channel acquisition processor 2611 determines whether or not a power-off signal is input. If the power-off signal is not input, the channel acquisition processor 2611 attempts to acquire a channel for the first communication mode (operation S809).

Meanwhile, if the channel for the second communication mode is determined to have been acquired in operation S806, the second communication mode is changed to an idle state (operation S810).

As apparent from the above description, according to the embodiments of the present invention, a hybrid phone supporting a voice/low-rate data communication service and a high-rate data communication service may be capable of providing voice call success ratio as high as a mobile phone supporting only voice and low-rate data communication services.

While the present invention has been described with reference to exemplary embodiments thereof, it will be understood by those skilled in the art that various changes in form and details may be made therein without departing from the scope of the present invention as defined by the following claims and their equivalents.

What is claimed is:

1. A mobile terminal to support at least two communication modes, the mobile terminal comprising:
   a wireless communication unit to communicate signals via an antenna; a memory to store an execution program and data; and a channel acquisition processor to acquire a channel for a first communication mode and change the first communication mode to an idle state if the channel is acquired, and then to acquire a channel for a second communication mode within a predetermined time interval according to the execution program in the memory,
   wherein if the predetermined time interval elapses, the channel acquisition processor stops acquiring the channel for the second communication mode and reattempts to acquire the channel for the first communication mode, and
   wherein the first communication mode includes at least one of a voice and low-rate data communication mode and the second communication mode includes a high-rate data communication mode.

2. The mobile terminal of claim 1, wherein the channel acquisition processor attempts to acquire at least one of the channel for the first communication mode and the channel for the second communication mode according to a channel list of each communication mode contained in a Preferred Roaming List (PRL) file stored in the memory.

3. A method for acquiring at least one channel in a mobile terminal, the method comprising:
   attempting to acquire a channel for a first communication mode;
   switching the first communication mode to an idle state if the channel for the first communication mode is acquired;
   attempting to acquire a channel for a second communication mode within a predefined time;
   switching the second communication mode to an idle state if the channel for the second communication mode is acquired; and
   stopping attempting to acquire the channel for the second communication mode if the predefined time is elapsed, and reattempting to acquire the channel for the first communication mode,
   wherein the first communication mode includes at least one of a voice and low-rate data communication mode and the second communication mode includes a high-rate data communication mode.

4. The method of claim 3, wherein at least one of the attempting to acquire the channel for the first communication mode and the attempting to acquire the channel for the second communication mode further comprises attempting to acquire the channel for the first communication mode and the channel for the second communication mode, respectively, according to a channel list of each communication mode contained in a Preferred Roaming List (PRL) file stored in a memory of the mobile terminal.

* * * * *